United States Patent Office 3,177,242
Patented Apr. 6, 1965

3,177,242
PURIFICATION OF ALIPHATIC DINITRILES
Karl Adam, Ludwigshafen (Rhine)-Gartenstadt, and Wolfgang Arend, Reinhold Frick, and Hans Haas, Ludwigshafen (Rhine), Germany, assignors to Badische Anilin- & Soda-Fabrik Aktiengesellschaft, Ludwigshafen (Rhine), Germany
No Drawing. Filed Dec. 9, 1960, Ser. No. 74,751
Claims priority, application Germany, Dec. 15, 1959,
B 55,919
2 Claims. (Cl. 260—465.8)

This invention relates to a new process for the purification of aliphatic dinitriles.

Aliphatic dinitriles may be converted by hydrogenation into the corresponding diamines which are known to be valuable initial materials for the production of polyamides. For this purpose, however, only very pure diamines can be used because otherwise the polyamides will be of inferior quality and will in particular tend to discoloration. Pure diamines, however, are only obtainable from pure dinitriles. Technical dinitriles contain varying amounts of impurities which are sometimes difficult to remove by simple methods, such as distillation. Technical adipodinitrile, for example, which can be obtained from adipic acid and ammonia in the presence of dehydration catalysts or from 1,4-dichlorbutane and alkali cyanides, contains, inter alia, tetrahydrofurane, 1-chlorbutene-(3), butadiene-(1,3), allylacetonitrile, δ-chlorvaleronitrile, δ-hydroxyvaleronitrile, δ-hydroxyvaleric acid, adipic acid, adipamide, 2-cyanocyclopentanone and 2-cyanocyclopentene-(1)-yl-amine. Furthermore, other unknown compounds are contained in technical adipodinitrile. A particularly troublesome impurity is 2-cyanocyclopentene-(1)-yl-amine because in the hydrogenation process it is converted mainly into 2-aminomethylcyclopentylamine and aminomethylcyclopentane. These substances adversely affect the properties of polyamides, for example by causing premature chain termination in polycondensation. Polyamides containing the said substances tend to turn yellow and are useless for the production fo fibers. 2-cyanocyclopentene-(1)-yl-amine and similar impurities can only be removed with difficulty by distillative methods.

The various impurities contained in other aliphatic dinitriles are less known in detail. In general, however, there are present the corresponding carboxylic acids, amide nitriles, acid amides as well as compounds which are known to contain imino and amino groups. In suberodinitrile, for example, amino and imino groups can be detected with the aid of the infra-red spectrum. Frequently, the technical dinitriles are so impure that even by repeated distillation they cannot be converted into a state which permits their continuous hydrogenation. Even in amounts of as little as 0.05%, the said impurities strongly interfere with the processing of the said dinitriles.

Various methods of purifying aliphatic dinitriles, in particular adipodinitrile, are known. For example, impurities which contain carbonyl or imino groups may be be converted by reaction with N,N-dialkylhydrazines into the corresponding hydrazones which are difficulty volatile.

According to another proposal, impurities containing amino or hydroxyl groups are converted by reaction with phenylisocyanate into ureas or urethanes which are also difficultly volatile. A disadvantage of the said two methods is that the reaction products of the impurities (which remain in the residue) readily decompose, in particular at the high temperatures present in discontinuous purification toward the end of distillation, so that the distillation product is again contaminated. Moreover, the substances to be added are not readily available and some of them are unpleasant to handle.

According to another known process, crude adipodinitrile is treated at room temperature with aqueous solutions of sulfurous acid or its salts, such as ammonium bisulfite, and the carbonyl compounds are thus converted into the bisulfite adducts. It is a disadvantage of this method that, even by repeated washing of the dinitrile with water and/or ammonia solutions, complete removal of the sulfurous acid derivatives, which are injurious to the hydrogenation catalysts, is achieved only with difficulty. Moreover, the purifying effect with respect to 2-cyanocyclopentene-(1)-yl-amine, whose presence in adipodinitrile is most undesirable, is not fully satisfactory.

According to another known process the formation, on heaitng adipodinitrile, of undesirable impurities which decolorize potassium permanganate solution is reduced by the addition of ammonium biphosphate. In this process, which is carired out in the absence of water, removal of impurities already present is not however observed.

It is also known that impurities contained in adipodinitrile can be removed by treating the same with acids. A disadvantage of this method is the slimy, difficulty filterable precipitate which is formed, particularly when strong acids are used in excess. Moreover, in particular when strong acids are used, nitrile groups of the adipodinitrile are also saponified. Furthermore, there is considerable corrosion of the apparatus, again especially when strong acids are used. On the other hand, the purifying action of weak acids does not satisfy present-day high requirements. Furthermore, some of the acids recommended, for example hydrochloric acid, are catalyst poisons which cannot be completely removed prior to hydrogenation.

Finally, a process is known in which, subsequent to the acid treatment described in the preceding paragraph, the crude dinitrile is treated with ammonia and then washed with water or salt solutions. As far as the acid treatment is concerned, the above considerations apply. Moreover, this method comprises a plurality of stages and is therefore more troublesome than the process according to the present invention.

It is an object of the present invention to provide a process by which high-purity dinitriles can be obtained in a simple manner. It is another object of the invention to provide a process for the purification of dinitriles for which only readily accessible substances are required which are not, and do not produce, catalyst poisons. It is a further object of this invention to provide a process by which pure dinitriles are obtained, without an appreciable number of nitrile groups being saponified or corrosion occurring. Further objects of the invention will become apparent in the following description.

In accordance with this invention, we have found that the said objects are achieved by heating dinitriles with water and a neutral ammonium salt.

By the new process, the impurities which are injurious to the quality of high-grade polyamides and which cannot be removed from dinitriles by simple methods, are rapidly converted into products which can be separated by distillation. Pure dinitriles are thus obtained in very good yields, from which diamines can be prepared which satisfy high requirements in the production of polyamides. Distillation is not absolutely necessary. In some cases, it is sufficient to convert the troublesome impurities into innocuous substances which need not be separated. This is especially so when only a small amount of neutral ammonium salts is used for purification.

As it has hitherto only been known to use acids or substances which react with certain functional groups in the impurities in known manner, it is surprising that treatment with neutral ammonium salts should lead to the desired result.

According to the new process, aliphatic dinitriles can be purified which, apart from the nitrile groups, have hydrocarbon structure and contain from 4 to 22 carbon atoms. The dinitriles may be straight-chained or branched, but must contain at least 2 carbon atoms between the nitrile groups.

Suitable initial materials include adipodinitrile, suberodinitrile, sebacodinitrile and the mixture of 1,9-dicyanoheptadecane and 1,10-dicyanoheptadecane known by the name of heptadecane dicarboxylic acid dinitrile. The crude dinitriles are prepared in the usual manner, for example by reaction of the corresponding dihalogen compounds with an alkali cyanide or by catalytic dehydration of the ammonium salts of the corresponding dicarboxylic acids. Another possibility for the production of dinitriles which can be purified according to this invention consists in telomerizing ethylene with the use of cyanogen chloride and reacting the ω-chlorcyanoalkanes thus obtained with an alkali cyanide.

By "neutral" ammonium salts we understand those which contain at least one ammonium group (which may also be substituted), but no longer contain an acid hydrogen atom, i.e., a hydrogen atom which may be replaced by a cation with the formation of a salt. In general, ammonium salts are used which contain no cation other than the ammonium ion. It is, however, possible to use salts of polybasic acids which are derived from ammonia or an amine on the one hand and an inorganic base on the other hand. A mixed neutral salt of the said type is, for example, sodium ammonium sulfate.

Preferred amines from which suitable N-substituted ammonium salts are derived, are primary, secondary and tertiary alkylamines with alkyl groups which contain 1 to 4 carbon atoms.

Suitable ammonium salts are derived from strong, medium strong or weak inorganic or organic acids. Suitable ammonium salts include ammonium chloride, ammonium sulfate, ammonium nitrate, disodium ammonium phosphate, ammonium carbonate, tributylammonium chloride, N,N-dimethylammonium sulfate, secondary butylammonium chloride and ammonium salts of organic acids, such as ammonium acetate and ammonium citrate. Although the nature of the anion in the ammonium salts of organic acids is not critical, those ammonium salts are preferred which are derived from fatty acids containing from 1 to 6 carbon atoms and from aromatic acids containing a hydrocarbon radical with from 6 to 10 carbon atoms.

The neutral ammonium salts need not be added as such. It is also possible to add a stoichiometrical amount of ammonia or of an amine to an aqueous solution of an acid or of an acid salt. The neutralized solution thus obtained may be used as a source of both neutral ammonium salt and water.

For reasons of accessibility, those neutral ammonium salts are preferred which are derived from ammonia, which contain no cation other than the ammonium ion and which are salts of inorganic acids.

The amount of the neutral ammonium salt to be added depends on the content of impurities in the initial material. As a rule, amounts of 0.01 to 10% by weight, advantageously 0.01 to 5% by weight, and most preferably 0.1 to 2% by weight, with reference to the initial material are used. The optimum amount required for the purification of a given dinitrile is readily ascertained by a preliminary experiment.

The presence of water is essential for the success of the process. For example, the content of 2-cyanocyclopentene-(1)-yl-amine in crude adipodinitrile can thus be diminished considerably further than by heating with an ammonium salt alone. It is preferable to add such an amount of water to the dinitrile that its water content is 1 to 20% by weight, advantageously 1 to 10% by weight, and most preferably 2 to 6% by weight. Obviously, it is also possible to use larger amounts of water, but working up of the mixture would thereby be made unnecessarily difficult. If the initial material contains water from the start, the amount of water to be added may be reduced accordingly or the addition of water may be dispensed with altogether.

The most favorable temperatures for the process are those between about 50° and about 200° C., particularly between about 100° and about 200° C. At temperatures below about 50° C., the process takes a very long time whereas, at temperatures above about 200° C., rapidly increasing amounts of undesirable byproducts are formed. Thus, for example, the above-mentioned 2-cyanocyclopentene-(1)-yl-amine is formed from adipodinitrile.

Purification may be carried out by agitating the initial material, the ammonium salt and water for some time, e.g., for 5 to 120 minutes, at the desired temperature. The adipodinitrile may then be used without further treatment for many purposes, but may also be further purified by distillation if desired. It is particularly expedient to combine the removal of the troublesome impurities with the distillation of the crude adipodinitrile by simply adding the ammonium salt and water during distillation. After a small quantity of first runnings, very pure adipodinitrile is obtained in very good yields.

The invention will be further illustrated by the following examples, but is not limited to these examples. The parts are parts by weight.

*Example 1*

0.5 part ammonium chloride and 10 parts of water are added to 100 parts of adipodinitrile which contains 0.12% of 2-cyanocyclopentene-(1)-yl-amine. The mixture is heated to 150° C., while stirring, and maintained at this temperature for 5 minutes. After cooling, the content of 2-cyanocyclopentene-(1)-yl-amine is as low as 0.0022%.

The content of 2-cyanocyclopentene-(1)-yl-amine is readily ascertained with the aid of the infra-red spectrum.

*Example 2*

200 parts of adipodinitrile, which contains 0.24% of 2-cyanocyclopentene-(1)-yl-amine, are heated with 1.8 parts of ammonium sulfate and 12 parts of water for 30 minutes at 200° C., while stirring. The water is expelled, and then 190 parts of adipodinitrile of the boiling point 165° C. with a content of 0.003% of 2-cyanocyclopentene-(1)-yl-amine are distilled off.

By distilling under the same conditions, but without previous treatment with ammonium sulfate and water, adipodinitrile with a content of 0.19% of 2-cyanocyclopentene-(1)-yl-amine is obtained if no first runnings are separated, and with a content of 0.10% of 2-cyanocyclopentene-(1)-yl-amine if the first runnings are 10%.

*Example 3*

After the addition of 0.5 part of ammonium carbonate, 200 parts of adipodinitrile containing 0.14% of 2-cyanocyclopentene-(1)-yl-amine and 5% of water are distilled by way of a column. The temperature in the still is 193° to 194° C.; the pressure is 40 mm. Hg absolute. After distilling off the water, there are obtained 20 parts of first runnings with a content of 0.05% of 2-cyanocyclopentene-(1)-yl-amine and 160 parts of adipodinitrile with a content of 0.02% of 2-cyanocyclopentene-(1)-yl-amine.

Similar results are obtained by using, instead of ammonium carbonate, equivalent amounts of dimethylammonium chloride, tributylammonium chloride or bis-(ethylammonium) sulfate.

*Example 4*

15 parts of water and 1.5 parts of ammonium nitrate are added to 300 parts of impure suberodinitrile, while stirring. The mixture is agitated for 30 minutes at 160° C. and the water expelled. By distillation under reduced pressure, 270 parts of suberodinitrile, boiling at 124° to 126° C./0.5 mm. Hg, are obtained.

The effect of the purification process becomes evident from the behavior of the dinitrile in hydrogenation.

(a) *Discontinuous operation.*—200 parts of suberodinitrile purified in the manner described above are charged into a pressure vessel and are hydrogenated, after the addition of 100 parts of a cobalt catalyst reduced in a stream of hydrogen and 300 parts of liquid ammonia, at 100° C. and 300 atmospheres hydrogen pressure with simultaneous rotary movement of the vessel.

160 parts of the hydrogenation product separated from the catalyst are distilled under reduced pressure. After 12 parts of first runnings, 139 parts of octamethylenediamine of the boiling point 130° C./20 mm. Hg are obtained. The yield is 87% of the theory. If a sample of 34.3 parts of the said octamethylenediamine is heated with 34.75 parts of pure adipic acid and 200 parts of water for 16 hours at 85° C., it has a yellowing number of 24 (according to the Hazen scale).

If, however, a suberodinitrile is used which has been purified only by thorough distillation and without the addition of an ammonium salt, and hydrogenation is carried out under the conditions specified above, the diamine is obtained in a yield of only 67% of the theory. The yellowing number of octamethylenediamine adipate prepared from this diamine is 111.

(b) *Continuous operation.*—A high-pressure tube of 3 m. length and 32 mm. internal width is filled with 1.8 liters of hydrogenation catalyst. After soaking with liquid ammonia, the tube is charged with a feed of suberodinitrile and liquid ammonia in the volumetric ratio 1:5. The hydrogen pressure is 300 atmospheres, the temperature is 90° C., the throughput is 2.4 liters of suberodinitrile per day.

If a suberodinitrile is used which has been purified with ammonium nitrate in the manner described above, the following results are obtained:

| Period of operation (days) | Yield of octa-methylene-diamine, percent | Suberodi-nitrile | Residue, percent |
|---|---|---|---|
| 7 | 96.2 | | 2.6 |
| 14 | 94.7 | | 4.0 |
| 21 | 95.3 | | 3.7 |

Hydrogenation is interrupted after 21 days, and afterwards a suberodinitrile which has been thoroughly distilled without the addition of an ammonium salt is used for the feed. The hydrogenation temperature must be 120° C., because at 90° C. a considerable part of the dinitrile would not be hydrogenated. The following results are obtained:

| Period of operation (days) | Yield of octa-methylene-diamine, percent | Suberodi-nitrile, percent | Residue, percent |
|---|---|---|---|
| 1 | 84.0 | 6.5 | 9.5 |
| 2½ | 37.5 | 46.1 | 16.4 |

By the process according to the present invention, aliphatic dinitriles can be purified to the necessary extent in a simple manner. The neutral ammonium salts employed in the process are cheap and cause only little corrosion. The process according to this invention can be carried out in one stage if the ammonium salt is added during distillation. Alkali compounds which are sometimes present in the crude dinitriles from the time of their preparation and which favor the formation of intramolecular or intermolecular condensation products, are rendered innocuous by the ammonium salts. For example, when ammonium sulfate is used, harmless sodium sulfate is formed. Dinitriles purified according to this invention may be directly hydrogenated in continuous operation to give the corresponding diamines. Not only are the diamines obtained in very good yields, but they are also purer than diamines prepared by hydrogenating dinitriles which have been purified by known methods. Polyamides prepared from dinitriles which have been purified according to this invention show less tendency to turn yellow than polyamides prepared from diamines which have been purified by conventional methods.

We claim:

1. A process for treating crude adipodinitrile to remove the impurity 2-cyanocyclopentene-(1)-yl - amine which process comprises: heating said crude adipodinitrile to a temperature between about 50° C. and about 200° C. in the presence of from 1% to 20% by weight of water and in the presence of from 0.01% to 10% by weight of a neutral ammonium salt selected from the group consisting of sodium ammonium sulfate, ammonium chloride, ammonium sulfate, ammonium nitrate, disodium ammonium phosphate, amonium carbonate, tributylammonium chloride, N,N-dimethylammonium sulfate, and secondary butylammonium chloride, whereby the said 2-cyanocyclopentene-(1)-yl-amine impurity is converted into a product which can be separated by distillation.

2. A process for treating crude adipodinitrile to remove the impurity 2-cyanocyclopentene-(1)-yl - amine which process comprises: heating said crude adipodinitrile to a temperature between about 100° C. and about 200° C. in the presence of from 2% to 6% by weight of water and in the presence of from 0.1% to 2% by weight of a neutral ammonium salt selected from the group consisting of sodium ammonium sulfate, ammonium chloride, ammonium sulfate, ammonium nitrate, disodium ammonium phosphate, ammonium carbonate, tributylammonium chloride, N,N-dimethylammonium sulfate, and secondary butylammonium chloride, whereby the said 2-cyanocyclopentene-(1)-yl-amine impurity is converted into a product which can be separated by distillation.

References Cited in the file of this patent

UNITED STATES PATENTS 2,242,309    Lazier et al. _____ May 20, 1941
2,581,354    Bordner _____ Jan. 8, 1952

OTHER REFERENCES

Bergmann: "Acetylene Chemistry," 1948, page 80.